Patented May 13, 1941

2,241,800

UNITED STATES PATENT OFFICE 2,241,800

PROCESS FOR PREPARING HYDRATED COPPER CHLORIDES

Fritz Wolff, Berlin-Pankow, Germany, assignor to Sherka Chemical Co. Inc., Bloomfield, N. J., a corporation of New York No Drawing. Application November 20, 1937, Serial No. 175,638. In Germany November 21, 1936

3 Claims. (Cl. 23—97)

This invention relates to weed destroying compounds especially to compounds of said kind that contain copper chloride.

The use of calcined copper chloride for destroying weeds is described in the German Patent 635,288. As stated therein crystallized copper chloride has the disadvantage that it agglomerates very readily to large lumps even when kept in closed containers; this agglomeration is due to its contents of moisture that varies according to the temperature; hence the preparation and the dosing of the spraying solution is rendered difficult.

Therefore in said patent the novel use of finely pulverised, calcined, anhydrous copper chloride was recommended which compound shows a considerable resistance to air-moisture. The special advantage of said anhydrous salt is to be seen in the fact that it can be ground very readily to most finely pulverised, almost imperceptible dust which does not dissolve instantaneously in water but can be atomized as such all over the fields, even without previously being dissolved in water. Thereby quantities are sufficient that do not surpass those of copper chloride in its usual application in form of a solution. In this case it is not at all necessary to admix disturbing inert material to the powder.

It is, however, impossible to grind the crystallized salt for the same purpose, because it cannot be converted to dust on account of its crystalline structure; for, due to the heat developed thereby and to the loss of water, it becomes smeary and sticks together thereafter.

The elimination of the water of crystallisation from the crystallized copper chloride, however, requires a considerable amount of work. Besides, it must be considered that during calcination hydrochloric acid is split off very readily, whereby water insoluble and therefore ineffective basic salts are formed.

For instance for the preparation of crystallized salt from a 44% solution 2 hours are necessary under certain temperature conditions and with a specific heating surface, while for the preparation of the anhydrous salt under the same conditions 8 hours are required.

Now it has been found that instead of the calcined anhydrous salt it is possible to use hydrated copper chlorides with special advantage as weed destroying compounds that can be converted to finely pulverised dust. This can not be done with the known crystallized copper chloride.

Crystals of copper chloride of the formula $CuCl_2.2H_2O$ have a contents of water of 21.1%. By evaporating a solution of such a copper chloride to dryness, for instance on the water bath, preferably by means of a vacuum, one may obtain hydrated reaction products which can be pulverised.

Products according to this invention can also be prepared in such a manner that a partly calcined product, for instance, a product containing 39.9% of copper is ground together with the necessary amount of water. Thus for instance by grinding 100 kgs. of the above mentioned copper chloride with 6 kgs. of water a product containing 37.5 of copper and 20.7% of water is obtained, likewise by grinding 100 kgs. of said copper chloride with 8 kgs. of water a product containing 37.0% of copper and 21.75% of water. During the process of grinding smearing is not observed as when grinding crystallised copper chloride although the contents of water of the final products may even be greater than that of the crystallised copper chloride. The final product represents always a dry stable powder. For instance, the following hydrated products according to this invention were obtained.

1. Powder of copper chloride, light brown ground to dust containing—

|  | Per cent |
    | --- | --- |
    | Copper | 39 |
    | Water | 15 |

2. Powder of copper chloride, light brown ground to dust containing—

|  | Per cent |
    | --- | --- |
    | Copper | 38.9 |
    | Water | 17.7 |

3. Powder of copper chloride, light brown ground to dust containing—

|  | Per cent |
    | --- | --- |
    | Copper | 38.0 |
    | Water | 19.6 |

4. Powder of copper chloride, light brown ground to dust containing—

|  | Per cent |
    | --- | --- |
    | Copper | 37.5 |
    | Water | 20.0 |

5. Powder of copper chloride, light green ground to dust containing—

|  | Per cent |
    | --- | --- |
    | Copper | 37.0 |
    | Water | 21.75 |

6. Powder of copper chloride, light green ground to dust containing—

|  | Per cent |
    | --- | --- |
    | Copper | 36.5 |
    | Water | 22.0 |

When comparing these powders with the following known products namely—

7. Powder of copper chloride, anhydrous, dark brown ground to dust containing—

| | Per cent |
|---|---|
| Copper | 47.2 |
| Water | 0 | or

8. Copper chloride crystals, green, splinters of crystals that on grinding become moist and smeary and stick together containing—

| | Per cent |
|---|---|
| Copper | 37.3 |
| Water | 21.1 | it is evident that a number of advantages are achieved. Thus in contrast to the calcined salt the new products 1–6 exhibit an extraordinary water solubility which on atomizing the powders has the effect that for dissolving the salt a very small amount of dew or air moisture is required. Hence the crystallized products according to this invention have not only a much more rapid effect than the calcined salt but also their breadth of action is increased with respect to the amount of dew and air moisture varying at the time of application. Thereby their effects are made much more certain because the power of adhesiveness is increased so that the powder cannot be removed by wind, even if it has taken up only a small amount of water. Furthermore the increase of surface achieved by using water containing products without the addition of disturbing, water absorbing inert material has a favourable effect on the powders. The new agents for destroying weeds can also be more readily dosed when making spraying solutions on account of their stable powdery condition. They can be stocked in containers without any disadvantage even when the air temperature varies considerably whereby, in contrast to the known crystallised copper chlorides, they remain stable over a long period of time.

What I claim is:

1. A method of producing dry hydrated cupric chloride in dust form for application to the destruction of weeds which consists essentially of calcining di-hydrated cupric chloride to a point where the water content thereof is substantially reduced to form at least a partially calcined product, then grinding said product with a substantial amount of water to form a re-hydrated cupric chloride which is light brown to light green in color, and continuing the grinding to form powder which does not become moist on exposure and the particles of which do not agglomerate.

2. A method of producing dry hydrated cupric chloride in dust form for application to the destruction of weeds which consists essentially of calcining di-hydrated cupric chloride to a point where the water content thereof is substantially below 15% to form at least a partially calcined product, then grinding said product with a substantial amount of water to form a re-hydrated cupric chloride which is light brown to light green in color, and continuing the grinding to form powder which does not become moist on exposure and the particles of which do not agglomerate.

3. A method of producing dry hydrated cupric chloride in dust form for application to the destruction of weeds which consists essentially of calcining di-hydrated cupric chloride to a point where the water content thereof is substantially reduced to form at least a partially calcined product, then grinding said product with a substantial amount of water to form a re-hydrated cupric chloride which contains an amount of water about equal to that contained in the dihydrate and which is light green in color, and continuing the grinding to form powder which does not become moist on exposure and the particles of which do not agglomerate.

FRITZ WOLFF.